Nov. 14, 1950 — L. C. ROWE — 2,529,816
ICE CREAM CONTAINER INSERT
Filed Jan. 27, 1948 — 2 Sheets-Sheet 2
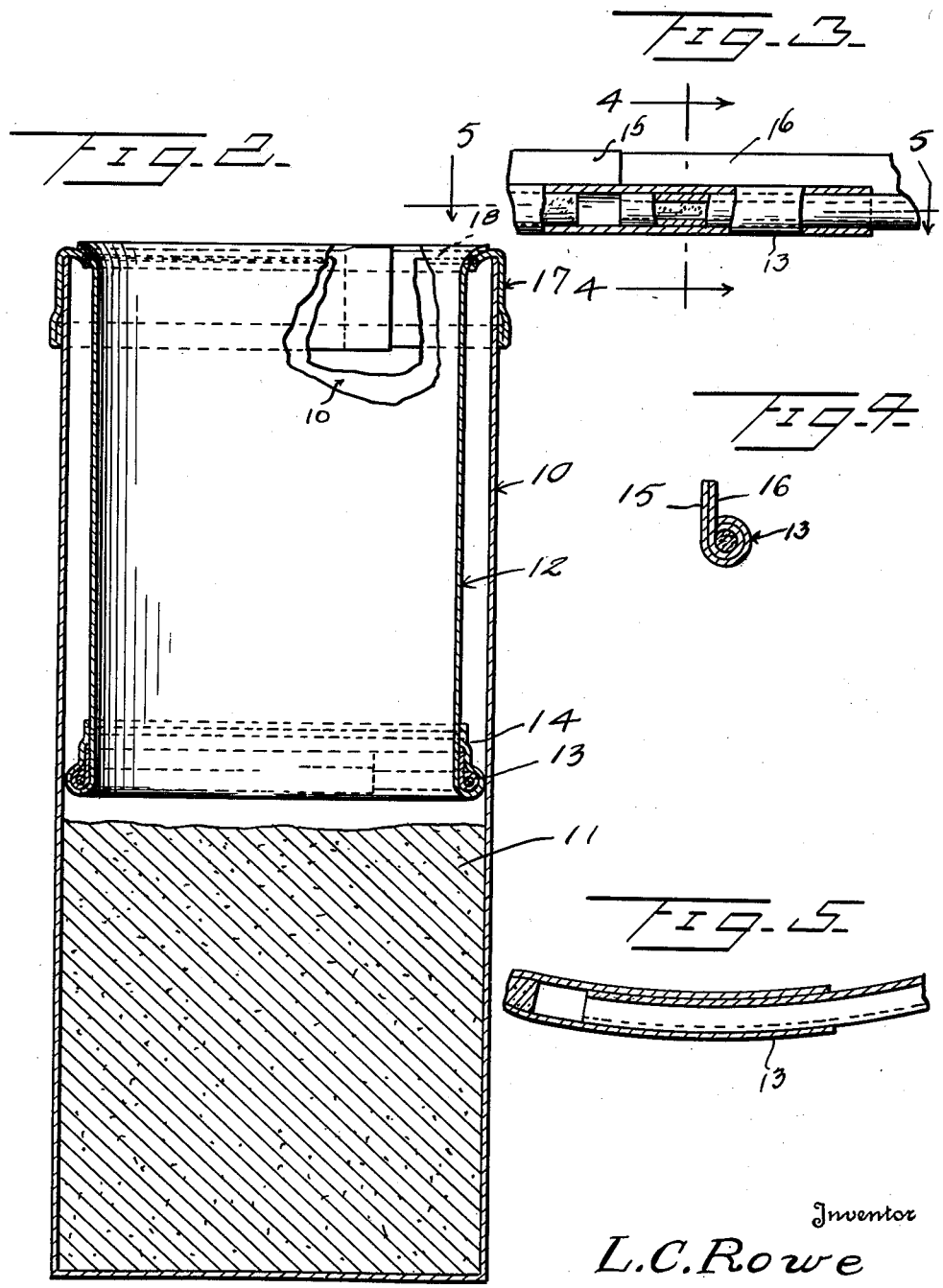
Inventor
L. C. Rowe
By Kimmel & Crowell
Attys.

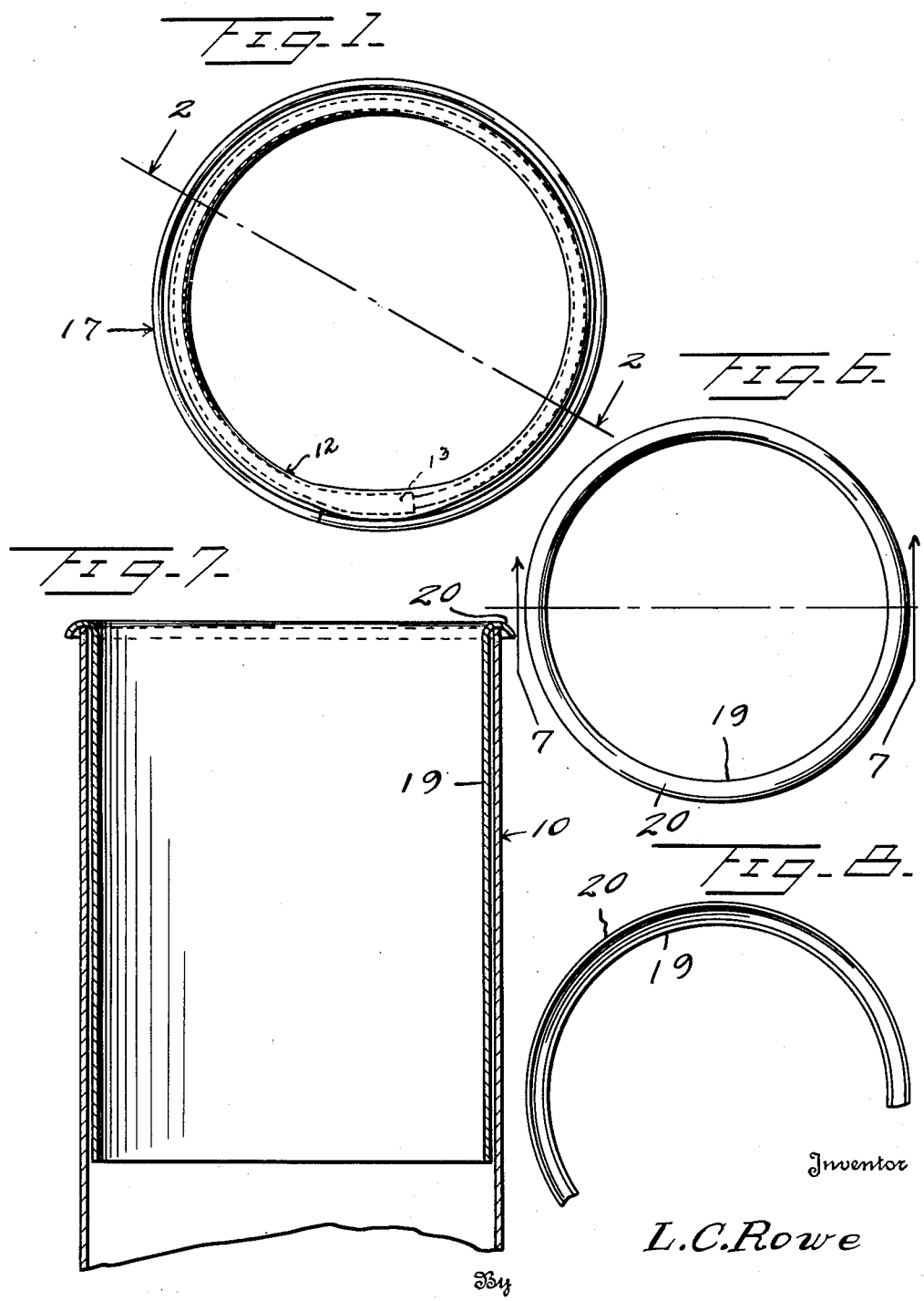

Patented Nov. 14, 1950

2,529,816

UNITED STATES PATENT OFFICE 2,529,816

ICE CREAM CONTAINER INSERT

Leroy Charles Rowe, Ellsworth, Mich.

Application January 27, 1948, Serial No. 4,612

1 Claim. (Cl. 220—63)

This invention relates to a sleeve for insertion into an ice cream receptacle for protecting the arm of a person dipping cream from the receptacle.

In the dispensing of ice cream or kindred products from a receptacle which is in a freezer, when the receptacle is partially emptied, such as from one-half or more, when an arm is extended into the receptacle the material on the side of the receptacle will be contacted by the sleeve on the arm so that the coat or shirt sleeve will become smudged by such material. It is therefore, an object of this invention to provide a sleeve protecting member which can be inserted in the receptacle after a predetermined quantity has been removed, so that the material adhering to the inside of the receptacle will be covered and such adhering material will not be able to contact a coat or shirt sleeve.

Another object of this invention is to provide a protecting member for insertion into a partially emptied receptacle which may be made out of paper, plastic, fabric or other suitable material which is self-supporting from the rim of the receptacle.

A further object of this invention is to provide a sleeve or arm protector of this kind which can be produced at low cost, it being contemplated that the device can be made either as a flexible or stiff member which is readily inserted into an ice cream receptacle and will protect the sleeve on an arm which is extended into the receptacle.

It will be readily noted that the present invention can be constructed, in one form thereof, entirely of suitable metal.

It will be further noted that the use of the invention is not necessarily restricted to dipping of ice cream, but is also suitable for use in frozen food cabinets or the like, wherever protection is desired both for the arm and sleeve of the user or for sanitary reasons, as to prevent contamination of the contents of a container or other receptacle in connection with which this invention is used.

The term "sleeve protecting liner" as used herein will be understood as constituting a description of all uses comprehended within the usefulness or utility of the invention disclosed in the foregoing objects and appended specification.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 1 is a plan view of a sleeve protecting member constructed according to an embodiment of this invention.

Figure 2 is a vertical section taken on the line 2—2 of Figure 1 showing the device in applied position.

Figure 3 is a fragmentary side elevation partly broken away and in section of the clamping or holding ring.

Figure 4 is a sectional view taken on the line 4—4 of Figure 3.

Figure 5 is a sectional view taken on the line 5—5 of Figure 3.

Figure 6 is a plan view of a modified form of this invention.

Figure 7 is a sectional view taken on the line 7—7 of Figure 6.

Figure 8 is a fragmentary bottom plan of the device shown in Figures 6 and 7.

Referring to the drawings and first to Figures 1 to 5, inclusive, the numeral 10 designates generally a receptacle or container such as is used for ice cream or the like. When the ice cream, designated 11, in the container 10 has been removed to a point substantially half-way down the container or receptacle 10, the person dipping cream from the container frequently contacts a sleeve with the wall of the container 10 and with the result that ice cream adhering to the wall of the container 10 will be wiped onto the sleeve. In order to provide a protecting means whereby the sleeve of an arm which is extended into the container 10 will be protected, I have provided a cylindrical flexible member, generally designated as 12, which is adapted to be suspendingly disposed within the upper portion of the container 10. The cylindrical member 12 may be constructed out of plastic, fabric, paper or other suitable material and the lower end of the cylindrical member 12 has mounted therein a split and expanding ring 13. The resilient ring 13 is secured to the lower end of the cylindrical member 12 of a hem or upturned lower end portion 14. In Figures 3, 4 and 5, there is disclosed in detail the telescoping ends of the split ring 13 and as will be herein disclosed the ring 13 also includes upwardly extending webs 15 and 16. The cylindrical member 12 at its upper end has secured thereto a suspension or holding member 17 in the form of a relatively narrow band which is fixed as by stitching 18 to the upper end of the cylindrical member 12.

By splitting the suspension member 17 this member can be readily looped over the upper end of the container 10 so as to thereby hold the cylindrical member 12 in substantially taut position inside the container 10.

Referring now to Figures 6, 7 and 8, there is disclosed a modified form of this invention wherein a cylindrical protecting member 19 is adapted to be loosely disposed within the container 10. The cylindrical member 19 may be made out of relatively rigid material such as cardboard, metal or other suitable material and the upper end of the cylindrical protecting member 19 is formed with a transversely arcuate flange 20 constituting a suspension means whereby the cylindrical member 19 will be suspendingly supported from the upper end or rim of the container 10.

In the use of this device when the ice cream or other material within the container 10 drops down to a point substantially mid-way of the depth of the container, the protecting cylinder 12 may be extended into the container 10, the split ring 13 being contracted sufficiently to permit the lower end of the cylindrical member 12 to be disposed closely adjacent the top of the ice cream 11. The suspension member 17 is then extended over the rim or upper end of the container 10 so that the cylindrical member 12 will be substantially taut. This cylindrical member 12 will provide a protecting lining which is removably inserted within the container 10 so that the remaining portion in the lower end of the container 10 may be dipped therefrom without having the sleeve of the arm wipe against any material which adheres to the wall of the container. As hereinbefore stated this protecting member may be made out of plastic material, fabric, paper, cardboard or other suitable material which can be readily inserted loosely within the conventional ice cream container. The protecting member may be retained within the container until the latter has been substantially entirely emptied.

I claim:

An ice cream container, a sleeve protecting liner for the upper portion only thereof comprising a flexible cylindrical inner liner, a split band of flexible material secured to the top of said liner, said band extending downwardly on the outside of the upper end of the container, the bottom edge of said liner being reverted and stitched to provide a hem, and a resilient metal split ring carried by the lower end of said liner within said hem and adapted to expand said lower end outwardly for engagement with the inner surface of the container to hold said lower end against upward movement.

LEROY CHARLES ROWE.

REFERENCES CITED

The following references are of record in the file of this patent:

UNITED STATES PATENTS

| Number | Name | Date |
|---|---|---|
| 1,421,628 | Watkins | July 4, 1922 |
| 1,612,986 | Reynolds | Jan. 4, 1927 |
| 1,861,112 | Christian | May 31, 1932 |
| 1,911,724 | Stein | May 30, 1933 |